United States Patent
Muraoka et al.

(10) Patent No.: US 11,627,485 B2
(45) Date of Patent: Apr. 11, 2023

(54) COMPUTER SYSTEM AND METHOD THEREFOR

(71) Applicants: NEC CORPORATION, Tokyo (JP); OSAKA UNIVERSITY, Suita (JP); THE DOSHISHA, Kyoto (JP)

(72) Inventors: Kazushi Muraoka, Tokyo (JP); Naoto Ishii, Tokyo (JP); Takumi Takahashi, Osaka (JP); Shinsuke Ibi, Kyoto (JP)

(73) Assignees: NEC CORPORATION, Tokyo (JP); OSAKA UNIVERSITY, Suita (JP); THE DOSHISHA, Kyoto (JP)

(*) Notice: Subject to any disclaimer, the term of this patent is extended or adjusted under 35 U.S.C. 154(b) by 44 days.

(21) Appl. No.: 17/230,202

(22) Filed: Apr. 14, 2021

(65) Prior Publication Data
US 2021/0321284 A1    Oct. 14, 2021

(30) Foreign Application Priority Data
Apr. 14, 2020 (JP) .............................. JP2020-072108

(51) Int. Cl.
*H04W 28/02* (2009.01)
*H04L 1/00* (2006.01)
*H04W 72/04* (2023.01)
*H04W 72/08* (2009.01)

(52) U.S. Cl.
CPC ......... *H04W 28/0236* (2013.01); *H04L 1/005* (2013.01); *H04W 72/0413* (2013.01); *H04W 72/087* (2013.01)

(58) Field of Classification Search
CPC ......... H04W 28/0236; H04W 72/0413; H04W 72/087; H04L 1/005
USPC ........................................................ 370/329
See application file for complete search history.

(56) References Cited

U.S. PATENT DOCUMENTS

| | | | |
|---|---|---|---|
| 2013/0142049 A1* | 6/2013 | Jim .................... | H04W 52/0225 370/241 |
| 2020/0036651 A1* | 1/2020 | Chautru ................ | H04L 47/805 |
| 2022/0029637 A1* | 1/2022 | Jeon .................... | H03M 13/1134 |

OTHER PUBLICATIONS

Pritam Som et al., "Improved Large-MIMO Detection Based on Damped Belief Propagation", 2010 IEEE Information Theory Workshop on Information Theory (ITW 2010, Cairo), 2010, 5pages.
Takumi Takahashi et al., "Design of Criterion for Adaptively Scaled Belief in Iterative Large MIMO Detection", IEICE Transactions on Communications, Feb. 2019, vol. E102.B Issue 2, pp. 285-297.

* cited by examiner

Primary Examiner — Chi Tang P Cheng
(74) Attorney, Agent, or Firm — Sughrue Mion, PLLC

(57) ABSTRACT

A computer system includes at least one memory and at least one processor coupled to the at least one memory and configured to execute one or more sets of instructions. The one or more sets of instructions, when executed by the at least one processor, cause the computer system to provide virtualized radio access network functions including executing a BP algorithm and provide controller functions including adjusting the total number of iterations of the BP algorithm depending on available computing resources of the computer system.

16 Claims, 12 Drawing Sheets

550

|  | TOTAL NUMBER OF ITERATIONS | | |
| --- | --- | --- | --- |
|  | 3 | 8 | 16 |
| 1ST ITERATION | $a_3^{(1)}, \eta_3^{(1)}$ | $a_8^{(1)}, \eta_8^{(1)}$ | $a_{16}^{(1)}, \eta_{16}^{(1)}$ |
| 2ND ITERATION | $a_3^{(2)}, \eta_3^{(2)}$ | $a_8^{(2)}, \eta_8^{(2)}$ | $a_{16}^{(2)}, \eta_{16}^{(2)}$ |
| 3RD ITERATION | $a_3^{(3)}, \eta_3^{(3)}$ | $a_8^{(3)}, \eta_8^{(3)}$ | $a_{16}^{(3)}, \eta_{16}^{(3)}$ |
| ⋮ |  | ⋮ | ⋮ |
| 8TH ITERATION |  | $a_8^{(8)}, \eta_8^{(8)}$ | $a_{16}^{(8)}, \eta_{16}^{(8)}$ |
| ⋮ |  |  | ⋮ |
| 16TH ITERATION |  |  | $a_{16}^{(16)}, \eta_{16}^{(16)}$ |

Fig. 9

| | TOTAL NUMBER OF ITERATIONS 550 | | |
|---|---|---|---|
| | 3 | 8 | 16 |
| 1ST ITERATION | $a_3^{(1)}, \{n_{3,i,t-k}^{(1)}\}$ | $a_8^{(1)}, \{n_{8,i,t-k}^{(1)}\}$ | $a_{16}^{(1)}, \{n_{16,i,t-k}^{(1)}\}$ |
| 2ND ITERATION | $a_3^{(2)}, \{n_{3,i,t-k}^{(2)}\}$ | $a_8^{(2)}, \{n_{8,i,t-k}^{(2)}\}$ | $a_{16}^{(2)}, \{n_{16,i,t-k}^{(2)}\}$ |
| 3RD ITERATION | $a_3^{(3)}, \{n_{3,i,t-k}^{(3)}\}$ | $a_8^{(3)}, \{n_{8,i,t-k}^{(3)}\}$ | $a_{16}^{(3)}, \{n_{16,i,t-k}^{(3)}\}$ |
| ... | | ... | ... |
| 8TH ITERATION | | $a_8^{(8)}, \{n_{8,i,t-k}^{(8)}\}$ | $a_{16}^{(8)}, \{n_{16,i,t-k}^{(8)}\}$ |
| ... | | | ... |
| 16TH ITERATION | | | $a_{16}^{(16)}, \{n_{16,i,t-k}^{(16)}\}$ |

Fig. 10

COMPUTER SYSTEM AND METHOD THEREFOR

INCORPORATION BY REFERENCE

This application is based upon and claims the benefit of priority from Japanese patent application No. 2020-072108, filed on Apr. 14, 2020, the disclosure of which is incorporated herein in its entirety by reference.

TECHNICAL FIELD

The present disclosure relates to a radio communication system, and in particular, to received signal processing.

BACKGROUND ART

Large-scale multi-user Multi-Input Multi-Output (MIMO) has been implemented in many wireless systems. The large-scale multi-user MIMO is also referred to as massive MIMO. The large-scale multi-user MIMO (or massive MIMO) can be used, for example, for uplink of a multiple access cellular system such as a 5th generation (5G) system. A receiver in the large-scale multi-user MIMO (massive MIMO) needs to perform Multi-User Detection (MUD) in order to separate multi-user signals.

One of the known MUD algorithms is a Belief Propagation (BP) algorithm (see, for example, Non-Patent Literature 1 and 2). The BP algorithm propagates quality values (these are called beliefs) that represent the reliability of detection symbols between iteration processes, to thereby gradually improve the detection accuracy. Practically, a detector that uses the BP algorithm includes a Soft Interference Canceller (IC), a Belief Generator (BG)), and a Soft Replica Generator (RG). The soft interference canceller subtracts interference components from received signals using replicas of respective transmission symbols obtained in the previous iteration. The belief generator generates beliefs based on post-cancellation signals. The soft replica generator generates replicas of transmitted signals based on the beliefs.

Techniques for improving the performance of soft decision detection or decoding that uses the BP algorithm include damping, scaling, and node selection. In the damping, a weighted average of the previous belief generated in the previous iteration and the current belief generated in the current iteration is used as a new belief, thereby stabilizing the fluctuations of beliefs that cause poor convergence (see Non-Patent Literature 1). A damping factor defines a weighting factor (or coefficient) of the weighted average. The scaling takes into account that the reliability of beliefs in early iterations is relatively low, and accordingly uses a parameter (i.e., scaling factor) for adjusting the absolute values of the beliefs so that they become gradually larger as the number of iterations increases, (see Non-Patent Literature 2). In the case of the MIMO detection, the node selection is used as a countermeasure against fading spatial correlations (i.e., correlations among receiving antennas) (see Non-Patent Literature 2). Specifically, in the node selection, a set of receiving antenna elements is divided into a plurality of subsets. Each subset is composed of receiving antenna elements spatially separated from each other (i.e., having lower correlations). The BP algorithm that involves node selection updates only the beliefs of one subset in each BP iteration and sequentially updates the beliefs of the other subsets in the following BP iterations.

Non-Patent Literature

Non-Patent Literature 1: P. Som, T. Datta, A. Chockalingam and B. S. Rajan, "Improved large-MIMO detection based on damped belief propagation," 2010 IEEE Information Theory Workshop on Information Theory (ITW 2010, Cairo), Cairo, 2010, pp. 1-5.

Non-Patent Literature 2: T. Takahashi, S. IBI and S. SAMPEI, "Design of Criterion for Adaptively Scaled Belief in Iterative Large MIMO Detection," IEICE TRANSACTIONS on Communications, 2019 Volume E102.B Issue 2 Pages 285-297

SUMMARY

The present inventors have studied a virtualized Radio Access Network (vRAN) environment and have found various problems therein. The vRAN utilizes Network Function Virtualization (NFV) in order to instantiate RAN functions. This allows Virtualized Network Functions (VNFs) to be executed on an open hardware platform, instead of implementing the above RAN functions on expensive proprietary hardware. The virtualized RAN functions are herein also referred to as RAN VNFs.

In some implementations, user-plane functions of a radio base station are virtualized. Consider a case in which physical (PHY) layer digital signal processing functions including a BP detection function for multi-user detection are virtualized. In this case, a BP algorithm will share computing resources (e.g., processing resources and memory resources) with other PHY layer signal processing (e.g., modulation/demodulation and coding/decoding). These computing resources may also be shared between the PHY layer signal processing and layer 2 signal processing (e.g., Medium Access Control (MAC) and Radio Link Control (RLC)). Furthermore, the RAN-VNF, which provides the PHY layer signal processing, may share these computing resources with other VNFs. For example, in a 5th generation (5G) system, a virtual gNB Distributed Unit User Plane (gNB-DU-UP) that provides the PHY layer signal processing may share computing resources with one or any combination of a virtual gNB-DU Control Plane (gNB-DU-CP), a virtual gNB Central Unit (gNB-CU), and a virtual User Plane Function (UPF) for local breakout.

When a BP detector is implemented on shared computing resources, a larger number of resources are consumed as the total number of iterations of the BP algorithm increases, which may disturb other processes that use these shared computing resources.

One of the objects to be attained by embodiments disclosed herein is to provide an apparatus, a method, and a program that provide an improvement suitable for implementation of a BP detector on shared computing resources. It should be noted that this object is merely one of the objects to be attained by the embodiments disclosed herein. Other objects or problems and novel features will be made apparent from the following description and the accompanying drawings.

In a first aspect, a computer system includes at least one memory and at least one processor coupled to the at least one memory and configured to execute one or more sets of instructions. The one or more sets of instructions, when executed by the at least one processor, cause the computer system to provide: virtualized radio access network (RAN) functions including executing a BP algorithm; and controller functions including adjusting a total number of iterations of the BP algorithm depending on available computing resources of the computer system.

In a second aspect, a method performed by a computer system, which includes at least one memory and at least one processor coupled to the at least one memory, includes the following steps:

(a) providing virtualized radio access network (RAN) functions including executing a BP algorithm; and (b) providing controller functions including adjusting a total number of iterations of the BP algorithm depending on available resources of the computer system.

In a third aspect, a program includes one or more sets of instructions (software codes) that, when loaded into a computer system, cause the computer system to perform the method according to the above-described second aspect.

BRIEF DESCRIPTION OF DRAWINGS

The above and other aspects, features, and advantages of the present invention will become more apparent from the following description of certain exemplary embodiments when taken in conjunction with the accompanying drawings, in which:

FIG. 9 is a diagram showing one example of parameter sets according to an embodiment;

FIG. 10 is a diagram showing one example of parameter sets according to an embodiment;

EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

First Embodiment

Figure 1:
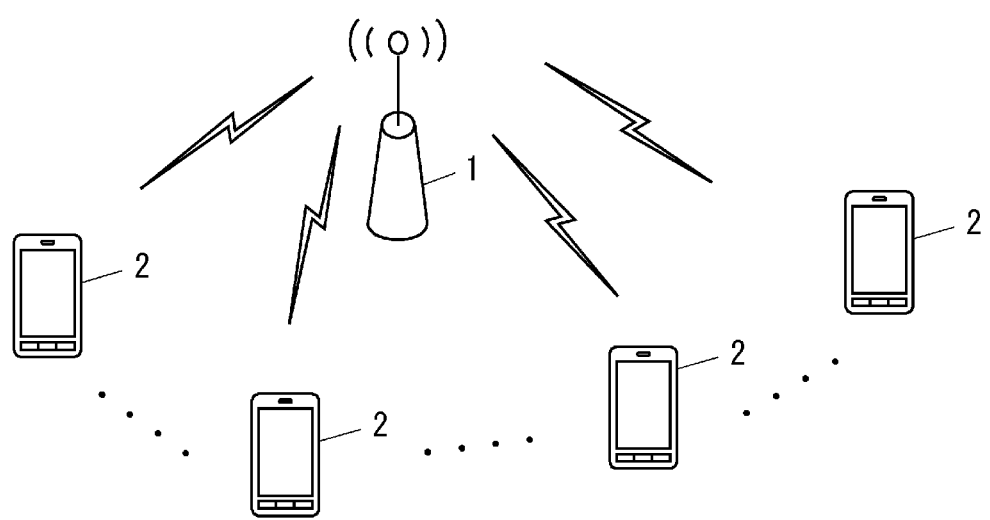
FIG. 1 is a diagram showing a radio communication system according to an embodiment.

FIG. 1 shows a configuration example of a radio communication system (i.e., a multiple access cellular system) according to a plurality of embodiments including this embodiment. Referring to FIG. 1, a base station 1 provides wireless access for a plurality of radio terminals 2. The base station 1 may also be referred to as an access point, a transmission/reception point (TRP), or other names. The base station 1 may be, for example, a gNB or a gNB Distributed Unit (gNB-DU) of a 5G system. In some implementations, the radio communication system may use a multi-user MIMO technique for uplink transmissions from the plurality of radio terminals 2 to the base station 1. In this case, the base station 1 may receive reference signals from the radio terminals 2, estimate a MIMO channel between the radio terminals 2 and the base station 1 using the received reference signals, receive data signals from the radio terminals 2, and detect transmitted signals using the estimated channel. That is, the base station 1 may perform MIMO detection in order to separate multi-user signals of the plurality of radio terminals 2.

Figure 2:
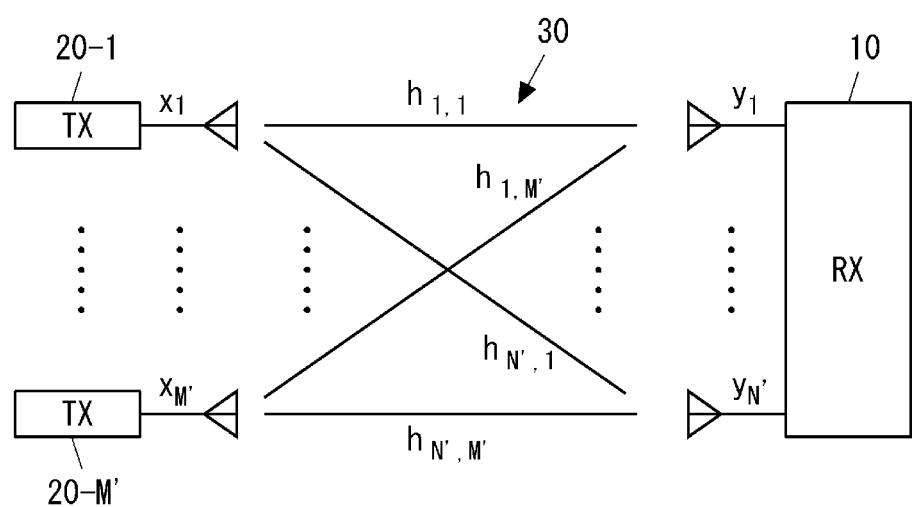
FIG. 2 is a diagram showing a system model according to an embodiment.

FIG. 2 shows one example of a system model of uplink multi-user MIMO transmission. In FIG. 2, transmitters 20 of the respective radio terminals 2 communicate with a receiver 10 of the base station 1 through a channel (propagation path) 30. In the example shown in FIG. 2, each of the M' transmitters 20 includes one transmitting antenna. Alternatively, each of the transmitters 20 may include two or more transmitting antennas. The receiver 10 of the base station 1 includes N' receiving antennas. It is assumed that the total number of transmitting antennas, M', is equal to or smaller than the total number of receiving antennas, N'.

In the following description, for the sake of simplicity, it is assumed that the transmitted signal from each radio terminal 2 (or each user) is a single carrier transmitted signal and the propagation path between each radio terminal 2 and the base station 1 is a flat-fading channel. Incidentally, in a multipath-fading environment where the transmitted signal from each user uses Orthogonal Frequency Division Multiplexing (OFDM), Single Carrier-Frequency Division Multiple Access (SC-FDMA) or the like, it may also be assumed that the propagation path of each subcarrier is a flat-fading channel by inserting a cyclic prefix having an appropriate length into the transmitted signal. Accordingly, this embodiment may be applied to OFDM and SC-FDMA.

Quadrature amplitude modulation (QAM) modulated transmitted signals are transmitted from the M' transmitting antennas of the plurality of radio terminals 2 and received by the base station 1 equipped with the N' receiving antennas. In this case, using the equivalent low-pass representation, a complex valued signal model can be expressed by the following equation:

$$y^c = H^c x^c + z^c$$

where $y^c$ is an N'×1 (i.e., N' rows and one column) complex received signal vector, $H^c$ is an N'×M' complex MIMO channel matrix, $z^c$ is an N'×1 complex noise vector, and $x^c$ is an M'×1 complex transmitted signal vector.

Denoting the number of the QAM modulation symbols as Q', Q' is equal to 4 in Quadrature Phase shift Keying (QPSK), while Q' is equal to 16 in 16QAM. It is assumed that the amplitude of the modulation symbol of each of the I axis and the Q axis is {+c,−c} in QPSK and it is {+c,−c,+3c,−3c} in 16QAM. The value c can be expressed by the following equation, where $E_s$ is average signal power. The power of complex noise in each of the receiving antennas is denoted by $N_0$.

$$c = \sqrt{\frac{3E_s}{2(Q'-1)}}$$

For the sake of simplicity, a received signal model, obtained by replacing the equivalent low-pass complex representation with an equivalent real-valued signal model y, can be expressed by the following equations:

$$y = Hx + z$$

$$y = \begin{bmatrix} \Re(y^c) \\ \Im(y^c) \end{bmatrix}$$

$$x = \begin{bmatrix} \Re(x^c) \\ \Im(x^c) \end{bmatrix}$$

$$z = \begin{bmatrix} \Re(z^c) \\ \Im(z^c) \end{bmatrix}$$

$$H = \begin{bmatrix} \Re(H^c) & -\Im(H^c) \\ \Im(H^c) & \Re(H^c) \end{bmatrix}$$

where y is an N×1 equivalent real-valued received signal vector, H is an N×M equivalent real-valued MIMO channel matrix, z is an N×1 equivalent real-valued noise vector, and x is an M×1 equivalent real-valued transmitted signal vector. The value N is equal to 2N', while the value M is equal to 2M'. Each transmitted signal is equivalent to a Pulse Amplitude Modulation (PAM) modulated symbol having the number of the modulation symbols Q equal to √Q' (i.e., square root of Q'), while the average signal power is $E_s/2$. Further, noise power included in each element of the noise vector z is $N_0/2$. The following provides a description of reception processing using the equivalent real-valued model.

Figure 3:
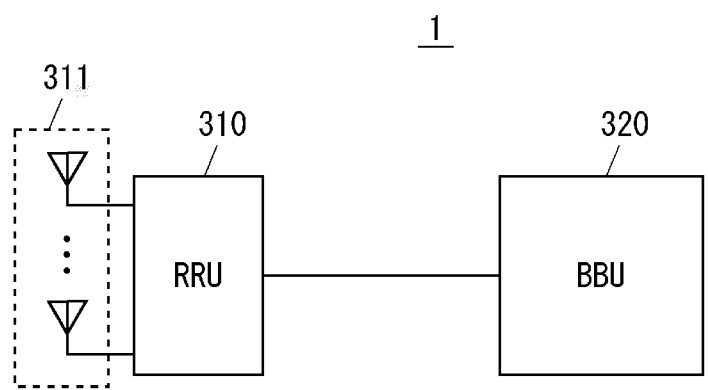
FIG. 3 is a diagram showing a configuration example of a base station according to an embodiment.

FIG. 3 shows a configuration example of the base station 1. Referring to FIG. 3, the base station 1 includes a remote radio unit (RRU) 310 and a baseband unit (BBU) 320. The RRU 310 may be referred to as a Remote Radio Head (RRH), a Radio Equipment (RE), a Radio Unit (RU), or other names. The BBU 320 may also be referred to as a Radio Equipment Controller (REC), a Data Unit (DU), a Distributed Unit (DU), a Central Unit (CU), or other names. The RRU 310 is connected to an antenna array 311 and performs PHY layer analog signal processing. The RRU 310 and the BBU 320 are connected to each other by, for example, a Common Public Radio Interface (CPRI) interface using optical fibers.

The BBU 320 at least performs received signal processing for multi-user detection (MIMO detection). The BBU 320 may perform other PHY layer digital signal processing. Further, the BBU 320 may perform part or all of layer 2 signal processing. The layer 2 signal processing may include MAC layer, RLC layer, and Packet Data Convergence Protocol (PDCP) layer processing. Further, the BBU 320 may provide control-plane functions (e.g., Radio Resource Control (RRC)) of the RAN. The BBU 320 may be, for example, a RAN node that corresponds to a gNB-DU of a 5G system or may be a RAN node that corresponds to both a gNB-DU and a gNB-CU.

Figure 4:
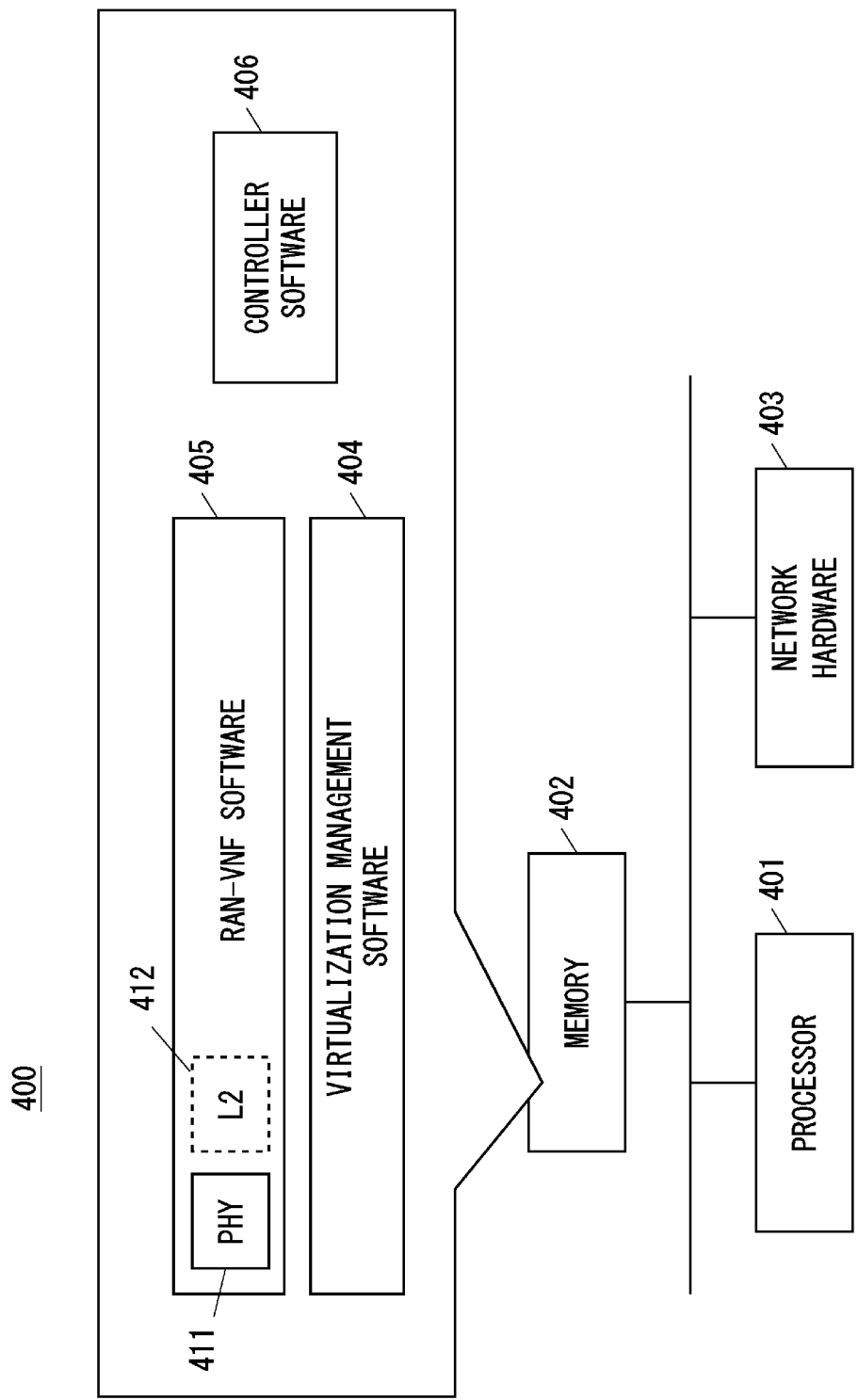
FIG. 4 is a diagram showing a configuration example of a virtualized BBU according to an embodiment.

FIG. 4 shows a configuration example of the BBU 320. In this embodiment, the BBU 320 is implemented on a computer system 400 as a virtualized RAN node (RAN-VNF). The computer system 400 includes hardware and software components. Referring to FIG. 4, the computer system 400 includes hardware components including a processor 401, a memory 402, and network hardware 403. The network hardware 403 is used to communicate with other network nodes (e.g., the RRU 310, a gNB-CU, and a core network node). The network hardware 403 may include, for example, optical interface hardware conforming to the CPRI and network interface hardware conforming to the IEEE 802.3 series.

The processor 401 includes one or more processors. The processor 401 may include, for example, one or more central processing units (CPUs), one or more digital signal processors (DSPs), one or more graphics processing units (GPUs), or any combination thereof.

The memory 402 is composed of a combination of a volatile memory and a non-volatile memory. The memory 402 may include a plurality of memory devices that are physically separated from each other. The volatile memory is, for example, a Static Random Access Memory (SRAM), a Dynamic RAM (DRAM), or a combination thereof. The non-volatile memory is a mask Read Only Memory (MROM), an Electrically Erasable Programmable ROM (EEPROM), a flash memory, a hard disc drive, or any combination thereof. The memory 402 may include a storage located apart from the processor 401.

In the example shown in FIG. 4, the memory 402 is used to store a plurality of software components (or modules) including software components 404-406. The virtualization management software 404 includes one or more sets of instructions accessed and executed by the processor 401. The virtualization management software 404, when executed by the processor 401, causes the processor 401 to abstract hardware components including the processor 401, the memory 402, and the network hardware 403 and provide a common interface to one or more VNF components. The virtualization management software 404 may include a Hardware Accelerator (HWA) and an Acceleration Abstraction Layer (AAL).

The RAN-VNF software 405 includes one or more sets of instructions accessed and executed by the processor 401. The RAN-VNF software 405, when executed by the processor 401, causes the processor 401 to provide vRAN functions. These vRAN functions at least include physical layer (PHY) functions 412. The PHY functions 412 at least include executing a BP algorithm in order to perform multi-user detection (MIMO detection). These vRAN functions may include other PHY layer signal processing functions (e.g., modulation/demodulation and coding/decoding), layer 2 signal processing functions (e.g., MAC, RLC), and/or control-plane functions (e.g., RRC).

The controller software 406 includes one or more sets of instructions accessed and executed by the processor 401. The controller software 406, when executed by the processor 401, causes the processor 401 to provide controller functions that include adjusting the total number of iterations of the BP algorithm performed by the RAN-VNF software 405 (or PHY functions 412) depending on available computing resources of the computer system 400. The available computing resources considered by the controller software 406 may include at least some of processing resources of the processor 401 (i.e., at least one processor). Additionally or alternatively, these computing resources may include at least some of memory resources of the memory 402 (i.e., at least one memory).

Figure 5:
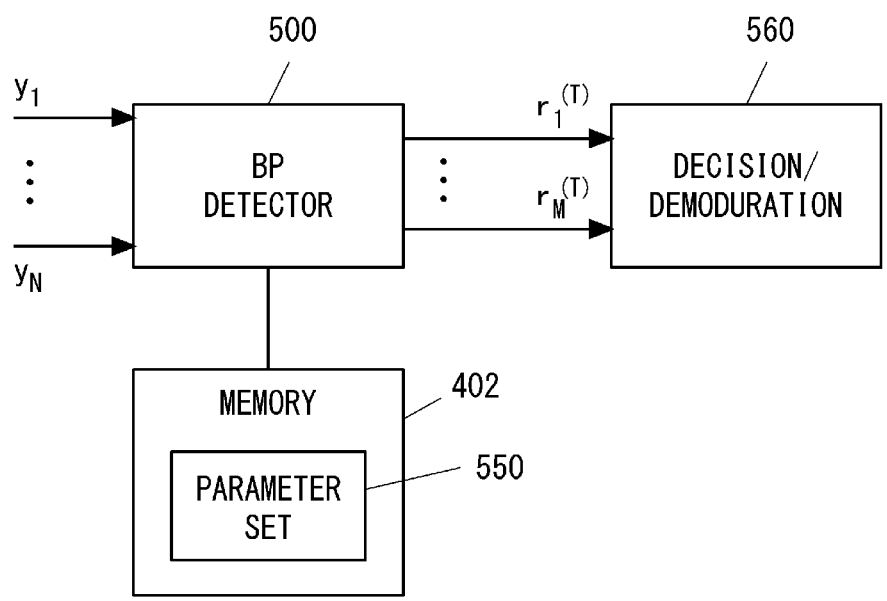
FIG. 5 is a diagram showing one example of PHY layer processing provided by a virtualized BBU according to an embodiment.

The PHY functions 412 provided by the processor 401 by executing the RAN-VNF software 405 may include a BP detector 500 and a decision and demodulation module 560 shown in FIG. 5.

The BP detector 500 receives N equivalent real-valued received signals, $y_1$ to $y_N$, obtained by the N' receiving antennas and executes the iterative BP algorithm with the total number of iterations T in order to perform multi-user detection. After that, the BP detector 500 provides the decision and demodulation module 560 with the estimated values, $r_1^{(T)}$ to $r_M^{(T)}$, regarding M separated equivalent real-valued transmitted signals. The decision and demodulation module 560 decodes transmitted signals of all the M users based on the estimated values $r_1(T)$ to $r_M(T)$.

In some implementations, the memory 402 stores a parameter set 550 to be used by the BP algorithm. The parameter set 550 includes a plurality of subsets that correspond to different total numbers of iterations. The BP detector 500 reads from the memory 402 a subset corresponding to the required total number of iterations and uses the subset in the BP algorithm. The required total number of iterations is determined in view of, for example, the number of users and the radio channel quality.

The parameter set 550 may include one or any combination of scaling factors, damping factors, and node selection factors. The subset for each total number of iterations may include a plurality of scaling factors. The BP detector 500 may use these scaling factors in different respective iterations of the BP algorithm. Additionally or alternatively, the subset for each total number of iterations may include a plurality of damping factors. The BP detector 500 may use these damping factors in different respective iterations of the BP algorithm. Additionally or alternatively, the subset for each total number of iterations may include a plurality of sets of node selection factors. The BP detector 500 may use these sets of node selection factors in different respective iterations of the BP algorithm.

As will be described later, the parameter set 550 may be obtained by deep learning. In some implementations, the parameter set 550 may include a plurality of scaling factors and a plurality of damping factors learned together (or concurrently) using a deep learning technique. In another implementation, the parameter set 550 may include a plurality of scaling factors and a plurality of node selection factors learned together using a deep learning technique. Further, learning of the parameters for each iteration (e.g., a scaling factor, a damping factor, and/or node selection factors) by a deep learning technique may be performed individually for different total numbers of iterations. By performing learning individually for different total number of iterations, it is possible to obtain parameters (e.g., a scaling factor, a damping factor, and/or node selection factors) per iteration that bring the best performance after the execution of the BP algorithm with the configured total number of iterations.

Figure 6:
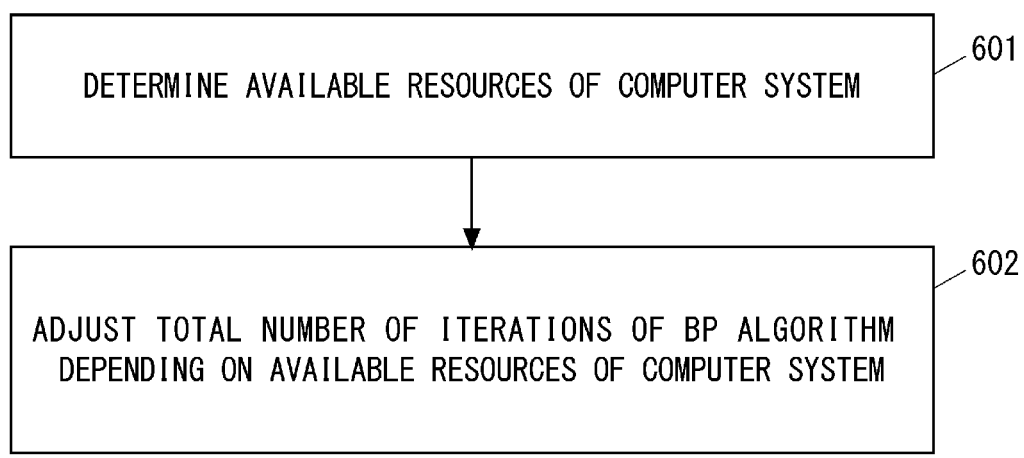
FIG. 6 is a flowchart showing one example of processing performed by a virtualized BBU according to an embodiment.

FIG. 6 shows one example of the controller functions provided by the processor 401 by executing the controller software 406. In Step 601, the processor 401 determines available resources of the computer system 400. As already described above, the available computing resources may include at least some of processing resources of the processor 401 (i.e., at least one processor). Additionally or alternatively, the computing resources may include at least some of the memory resources of the memory 402 (i.e., at least one memory).

In Step 602, the processor 401 adjusts the total number of iterations of the BP algorithm executed by the BP detector 500 according to the available resources of the computer system 400. The processor 401 may consider current available resources or estimated future available resources.

In some implementations, the processor 401 may control the BP detector 500 to increase the total number of iterations as the available resources increases, or conversely decrease the total number of iterations as the available resources decreases. In some implementations, the processor 401 may determine the maximum total number of iterations and notify the BP detector 500 of the determined number. The BP detector 500 may execute the BP algorithm in accordance with the total number of iterations equal to or smaller than the maximum total number of iterations. The processor 401 may increase the maximum total number of iterations as the available resources increases, or conversely decrease the maximum number of iterations as the available resources decreases.

According to the processing shown in FIG. 6, the processor 401 is able to adjust the number of BP iterations in the BP detector 500 adaptively based on current or future usage status of the shared computing resources. This can provide an improvement suitable for implementation of a BP detector on shared computing resources.

Figure 7:
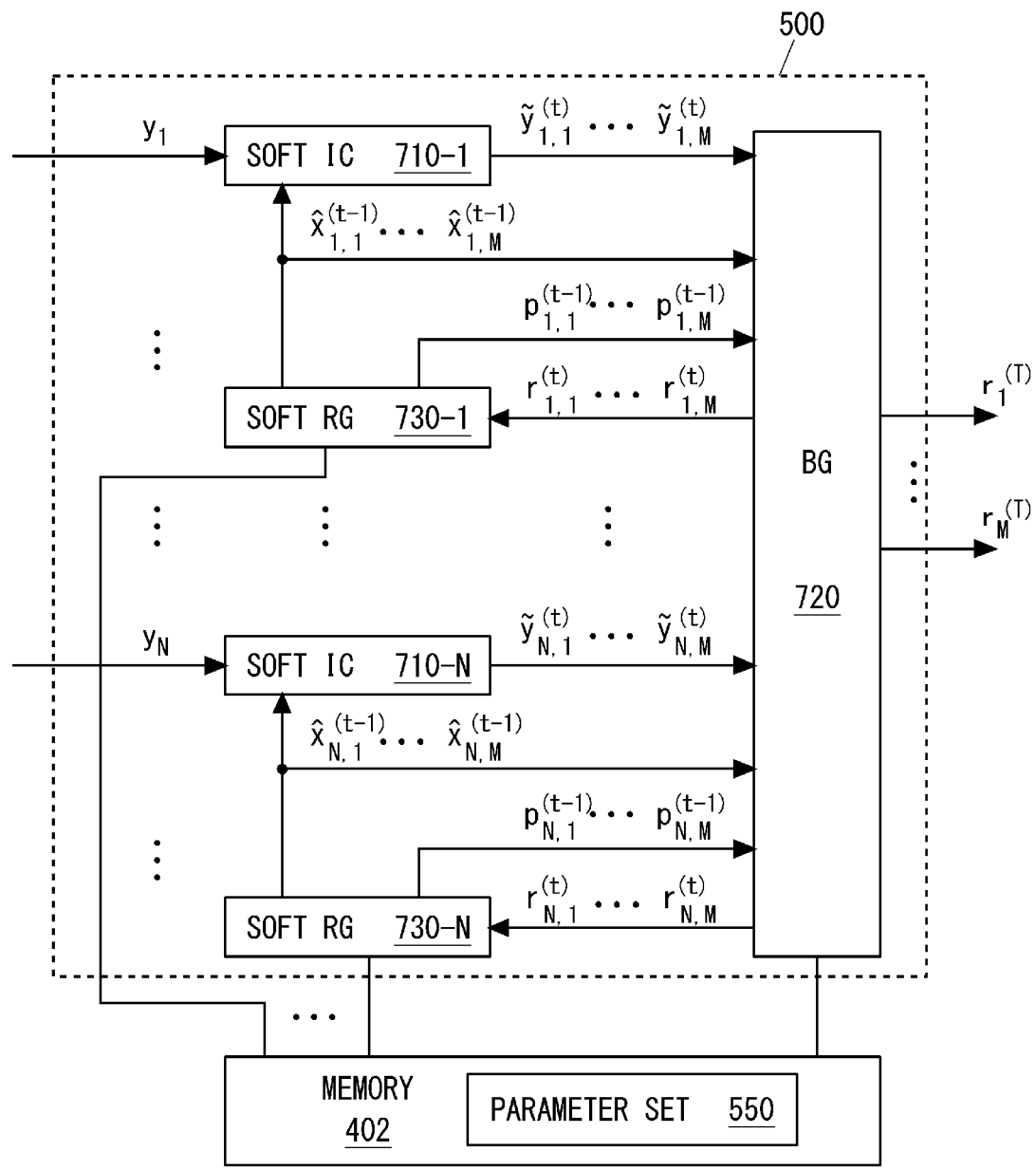
FIG. 7 is a diagram showing a configuration example of a BP detector according to an embodiment.

The following provides a description of a configuration example of the BP detector 500. FIG. 7 shows a configuration example of the BP detector 500. Referring to FIG. 7, the BP detector 500 includes N soft interference cancellers 710-1 to 710-N, a belief generator 720, and N soft replica generators 730-1 to 730-N. The soft interference cancellers 710-1 to 710-N respectively receive the N received signals $y_1$-$y_N$ obtained by the N receiving antennas. The soft interference canceller 710-1 receives, for example, the received signal $y_1$ of a first antenna (this signal is referred to as a first received signal). In addition, in order to perform the t-th iteration, the soft interference canceller 710-1 receives soft replicas x $\hat{}_{1,1}^{(t-1)}$ to x $\hat{}_{1,M}^{(t-1)}$ of all the transmitted signals generated in the previous (t−1)-th iteration. Here, x hat means x with circumflex (^). The soft interference canceller 710-1 then generates post-cancellation received signals y tilde$_{1,1}^{(t)}$ to y tilde$_{1,M}^{(t)}$. Here, y tilde means y with a tilde (~) above.

The belief generator 720 reads the damping factors (or the sets of node selection factors) included in the parameter set 550 from the memory 402. The belief generator 720 receives the post-cancellation received signals y tilde$_{1,1}^{(t)}$ to y tilde$_{1,M}^{(t)}$ from the soft interference canceller 710-1. The belief generator 720 also receives post-cancellation received signals y tilde$_{n,1}^{(t)}$ to y tilde$_{n,M}^{(t)}$ similarly generated by each of the remaining soft interference cancellers 710-n (where n is between 2 and N). Then the belief generator 720 generates beliefs $r_{1,1}^{(t)}$ to $r_{1,M}^{(t)}$ associated with the first received signal using the damping factor (or the set of node selection factors) for the t-th iteration. Likewise, the belief generator 720 generates beliefs associated with each of the remaining second to n-th received signals.

The soft replica generator 730-1 reads the scaling factors included in the parameter set 550 from the memory 402. The soft replica generator 730-1 receives the beliefs $r_{1,1}^{(t)}$ to $r_{1,M}^{(t)}$ associated with the first received signal from the belief generator 720. Then the soft replica generator 730-1 generates soft replicas x hat$_{1,1}^{(t)}$ to x hat$_{1,M}^{(t)}$ and further generates soft replica's power $p_{1,1}^{(t)}$ to $p_{1,M}^{(t)}$ using the scaling factor for the t-th iteration.

After the completion of the BP processing with the total number of iterations T, the belief generator 720 determines the estimated values $r_1^{(T)}$ to $r_M^{(T)}$ of the M separated transmitted signals and provides these estimated values for the decision and demodulation module 560.

The following provides further details of the processing performed by the soft interference canceller 710, the belief generator 720, and the soft replica generator 730.

(1) Soft Interference Canceller

In the first iteration, soft replicas have not yet been generated. The soft interference canceller 710 thus supplies the first to N-th received signals to the belief generator 720 without performing cancellation processing. In the t-th iteration, which is the second or any subsequent iteration, the soft interference canceller 710-n associated with the n-th received signal cancels M−1 transmitted signal components other than the m-th transmitted signal from the n-th received signal and generates the post-cancellation received signal y tilde$_{n,m}^{(t)}$. The post-cancellation received signal y tilde$_{n,m}^{(t)}$ is given by the following equation:

$$\tilde{y}_{n,m}^{(t)} = y_n - \sum_{\substack{i=1 \\ j \neq m}}^{M} h_{n,j}\hat{x}_{n,j}^{(t-1)}$$

where $y_n$ is the received signal of the n-th receiving antenna, $h_{n,j}$ is a channel response between the j-th transmitting antenna and the n-th receiving antenna, and x hat$_{n,j}^{(t-1)}$ is a soft replica of the transmitted signal of the j-th transmitting antenna obtained in the (t−1)-th iteration processing. As described above, the base station 1 (or the BBU 320) is able to estimate the channel response using the reference signal transmitted from the radio terminal 2. The post-cancellation received signal y tilde n,m$^{(t)}$ is supplied to the belief generator 720.

(2) Belief Generator

The belief generator 720 generates beliefs using the post-cancellation received signals. First, the belief generator 720 performs processing expressed by the following equation using the post-cancellation received signal y tilde$_{n,m}^{(t)}$ regarding the n-th receiving antenna, thereby obtaining a transmitted signal component $s_{n,m}^{(t)}$ in the t-th iteration:

$$s_{n,m}^{(t)} = \frac{h_{n,m}\tilde{y}_{n,m}^{(t)}}{\Psi_{n,m}^{(t)}}$$

where $\psi_{n,m}^{(t)}$ is a residual interference and noise power. The residual interference and noise power $\psi_{n,m}^{(t)}$ is obtained by the following equations:

$$\Psi_{n,m}^{(t)} = \sum_{\substack{i=1 \\ j \neq m}}^{M} h_{n,j}^2 \delta_{n,j}^{(t)} + \frac{N_0}{2}$$

$$\delta_{n,j}^{(t)} = p_{n,j}^{(t-1)} - (\hat{x}_{n,j}^{(t-1)})^2$$

where $p_{n,j}^{(t-1)}$ is the power of the soft replica. As described above, the soft replica's power is generated by the soft replica generator 730.

The equivalent gain $\omega_{n,m}^{(t)}$ to the true transmitted signal $x_m$ included in the transmitted signal component $s_{n,m}^{(t)}$ is used for normalization in the scaling processing and is given by the following equation:

$$\omega_{n,m}^{(t)} = \frac{h_{n,m}}{\Psi_{n,m}^{(t)}}$$

Next, the belief generator 720 generates a belief $r_{n,m}^{(t)}$ using the transmitted signal component $s_{n,m}^{(t)}$. The belief generator 720 uses either the damping processing or the node selection processing. The damping processing calculates the weighted average of the transmitted signal component obtained in the previous (t−1)-th iteration and the transmitted signal component obtained in the current t-th iteration by using the damping factor $\eta^{(t)}$ as follows:

where s'$_{n,m}^{(t)}$ is a transmitted signal component after the damping processing. As a result of this damping processing, the equivalent gain included in s'$_{n,m}^{(t)}$ is given by the following equation:

On the other hand, in the node selection, s'$_{n,m}^{(t)}$ is calculated by synthesizing the transmitted signal components of the antennas obtained in the latest K iterations, which is given by the following equation:

where $\eta_{i,t-k}^{(t)}$ is a node selection factor indicating how much the transmitted signal component $s_{i,m}^{(t-k)}$ is considered in the t-th iteration. In the existing node selection method, the value of the node selection factor $\eta_{i,t-k}^{(t)}$ is either 0 or 1, which means that it is alternatively determined whether or not to take the node i (i.e., observation node, receiving antenna) into account. On the other hand, in this embodiment, the node selection factor $\eta_{i,t-k}^{(t)}$ is a real number value between 0 and 1 (or a real number value not less than 0 and not greater than 1). Accordingly, the node selection factor $\eta_{i,t-k}^{(t)}$ of this embodiment is able to finely adjust how much the transmitted signal component $s_{i,m}^{(t-k)}$ of the node i is considered in the t-th iteration. Besides, the node selection factor $\eta_{i,t-k}^{(t)}$ of this embodiment is learnable (or trainable) in deep learning, as will be described later. When K=t in the above expression, the transmitted signal components obtained in all the past iterations are used in the node selection.

As a result of the node selection processing, the equivalent gain included in s'$_{n,m}^{(t)}$ is given by the following equation:

The belief generator 720 normalizes s'$_{n,m}^{(t)}$ obtained by either the damping or the node selection with of $\omega_{n,m}^{(t)}$, thereby generating a normalized belief $r_{n,m}^{(t)}$. The belief generator 720 supplies the normalized belief to the soft replica generator 730. The normalized belief $r_{n,m}^{(t)}$ is expressed by the following equation:

$$r_{n,m}^{(t)} = \frac{s'^{(t)}_{n,m}}{\omega'^{(t)}_{n,m}}$$

(3) Soft Replica Generator

The soft replica generator 630 scales the belief $r_{n,m}^{(t)}$ with a scaling factor $a^{(t)}$ and calculates the soft replica x hat$_{n,m}^{(t)}$ and soft replica's power $p_{n,m}^{(t)}$ in accordance with the following equations:

$$\hat{x}_{n,m}^{(t)} = c \sum_{s' \in S_{Q'}} \tanh\left(\frac{a^{(t)}}{c}(r_{n,m}^{(t)} - s')\right)$$

$$p_{n,m}^{(t)} = 2c \sum_{s' \in S_{Q'}} s' \tanh\left(\frac{a^{(t)}}{c}(r_{n,m}^{(t)} - s')\right)$$

where $E_s^{max}$ is the energy of the largest PAM symbol possible and s' is a determination threshold for PAM modulation. The value $E_s^{max}$ is given by the following equation:

$$E_s^{max} = (\sqrt{Q'} - 1)^2 c^2$$

The determination threshold s' can have any value of a set $S_{Q'}$. The set $S_{Q'}$ is $\{0\}$ for QPSK and $\{0, +2c, -2c\}$ for 16QAM. The tanh function is a hyperbolic tangent function. These equations indicate that the soft replica $\hat{x}_{n,m}^{(t)}$ and the soft replica's power $p_{n,m}^{(t)}$ are generated by synthesizing belief information around the determination threshold.

(4) Output of BP Detector

After the completion of the T iterations, the belief generator 720 supplies the estimated value $r_m^{(T)}$ of each of the M separated transmitted signals to the decision and demodulation module 560. The estimated value $r_m^{(T)}$ is given by the following equation:

$$r_m^{(T)} = \left(\sum_{i=1}^{N} s_{i,m}^{(T)}\right) \bigg/ \left(\sum_{i=1}^{N} \omega_{i,m}^{(T)}\right)$$

Second Embodiment

Configurations of a radio communication system and a base station according to this embodiment are similar to those in the examples described with reference to FIGS. 1-5. This embodiment provides a method of learning of parameters to be used in the BP algorithm.

Figure 8:
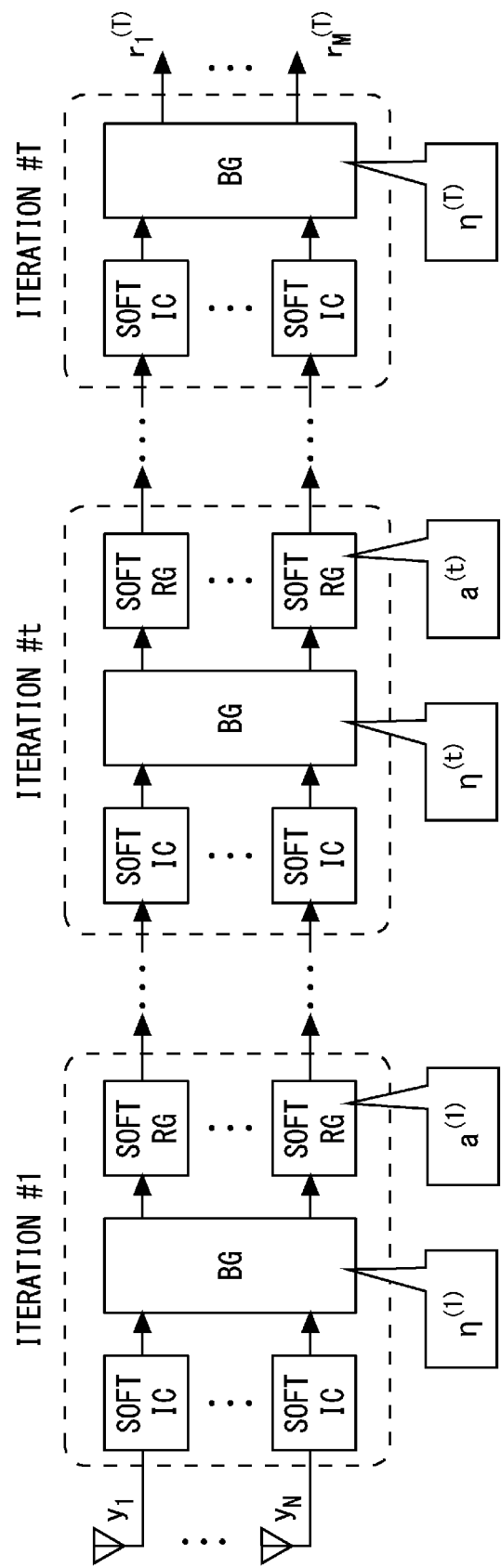
FIG. 8 is a conceptual diagram showing deep unfolding of a BP detector according to an embodiment.

FIG. 8 is a conceptual diagram showing deep unfolding for the multi-user detection based on the BP. The deep unfolding is a method of unfolding the iterative algorithm in the iterative direction, assuming that the obtained process flow graph is a Deep Neural Network (DNN), and using a scheme of deep learning. The BP network shown in FIG. 8 is given by unfolding the iterations performed by the BP detector 500. Each BP iteration corresponds to one layer of the DNN. Accordingly, it is possible to learn meta parameters embedded in the BP network. Specifically, the learnable (or trainable) parameters are the scaling factor $a^{(t)}$ and the damping factor $\eta^{(t)}$ in each iteration (or each layer), or the scaling factor $a^{(t)}$ and the set $\{\eta_{i,t-k}^{(t)}\}$ of node selection factors in each iteration (or each layer). The learning is performed, for example, based on a gradient method and the meta parameters are adjusted together in the direction in which the cost becomes smaller.

A training data set used for deep learning includes a transmitted signal data set and a received signal data set. The transmitted signal data set may be randomly generated. The received signal data set corresponds to the transmitted signal data set and is generated using the transmitted signal data set and a given channel matrix. The channel matrix may be randomly generated or may be generated based on a propagation path model defined in the 3rd Generation Partnership Project (3GPP) specifications or the like. Alternatively, the channel matrix may be generated based on measurement results in the actual environment where the base station 1 (or the antenna array 311) is installed.

In one example, the deep learning may use an update algorithm, such that a gradient method. The gradient update method to be used may be, for example, an Adaptive moment estimation (Adam) optimizer algorithm. In addition, mini-batch learning may be used. The number of learning iterations may be set to an appropriate value in view the risk of overfitting to the training data. To update the learning rate, a Step algorithm that gradually narrows the update width with respect to the number of learning iterations may be used. The cost function may be a Mean Square Error (MSE).

FIG. 9 shows one example of sets of the scaling factors and the damping factors obtained by deep learning. These learned parameters may be stored in the memory 402 as for example a lookup table (LUT). The table shown in FIG. 9 stores learned parameters for the total numbers of BP iterations T of three values (i.e., 3, 8, and 16). In this case, the processor 401 (or the BP detector 500) of the base station 1 (or the BBU 320) may use in the iterative BP algorithm the subset of parameters corresponding to the configured (or selected) number of iterations T. The parameters for the number of iterations T include a scaling factor $a_T^{(t)}$ and a damping factor $\eta_T^{(t)}$ per iteration. The subscripts for these parameters indicate the total number of iterations. Specifically, when the total number of iterations T is 3, the learned parameters include: a set of a scaling factor $a_3^{(1)}$ and a damping factor $\eta_3^{(1)}$ for the first iteration; a set of a scaling factor $a_3^{(2)}$ and a damping factor $\eta_3^{(2)}$ for the second iteration; and a set of a scaling factor $a_3^{(3)}$ and a damping factor $\eta_3^{(3)}$ for the third iteration.

FIG. 10 shows one example of combinations of a scaling factor and node selection factors obtained by deep learning. Like in the table shown in FIG. 9, the table shown in FIG. 10 stores learned parameters for the cases that the total numbers of BP iterations T are 3, 8, and 16. The parameters for the number of iterations T include a scaling factor $a_T^{(t)}$ and a set $\{\eta_{T,t-k}^{(t)}\}$ of node selection factors per iteration.

The examples shown in FIGS. 9 and 10 are merely examples. The BP detector 500 may be supplied with learned parameters for four or more values of the total number of iterations.

According to this embodiment, the BP detector 500 uses a parameter set learned together using a deep learning technique. According to this embodiment, it is thus possible to allow the base station 1 (or the BBU 320) to use a near-optimal set of parameters in each BP iteration.

Third Embodiment

Configurations of a radio communication system and a base station according to this embodiment are similar to those in the examples described with reference to FIGS. 1 to 5. This embodiment provides one example of controlling the total number of iterations of the BP algorithm. In this embodiment, the processor 401 (or the controller functions) estimates available resources of the computer system 400 based on uplink scheduling of the base station 1 (or the BBU 320).

Figure 11:
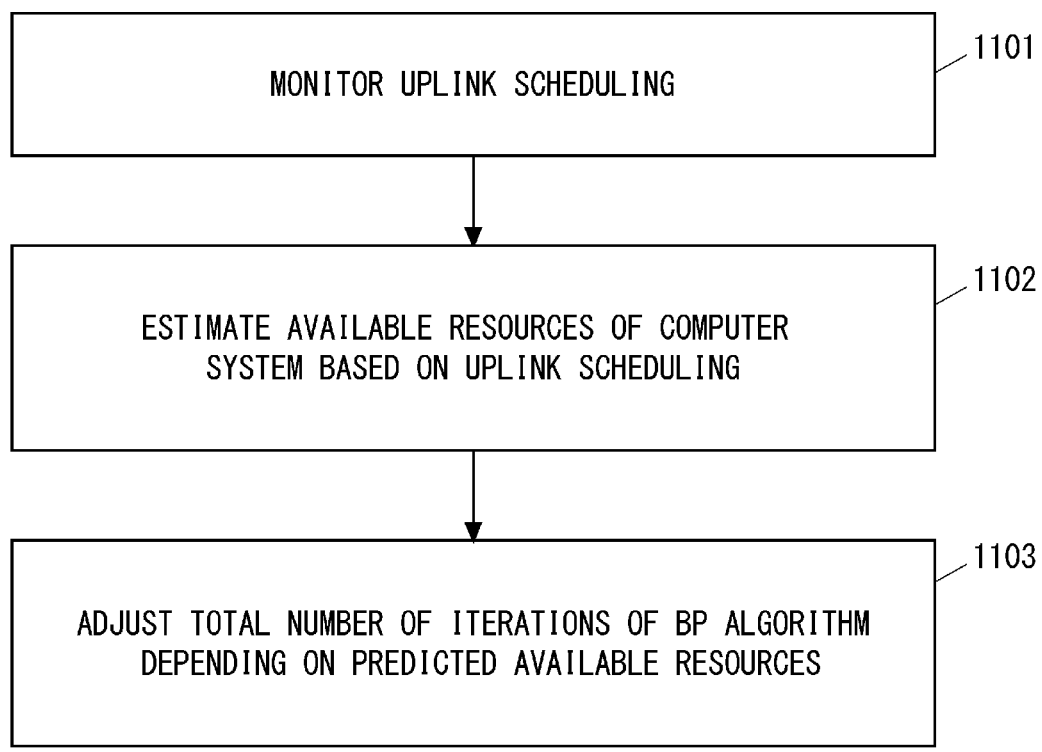
FIG. 11 is a flowchart showing one example of processing performed by a virtualized BBU according to an embodiment.

FIG. 11 shows one example of the controller functions provided by the processor 401 by executing the controller software 406. In Step 1101, the processor 401 monitors uplink scheduling performed by the BBU 320. The BBU 320 schedules a plurality of uplink transmissions to be performed by a plurality of radio terminals 2. More specifically, the BBU 320 calculates, for each radio terminal 2 or for each uplink transmission, a metric value which is based on its priority level, fairness, and communication efficiency, compares the metric values of the radio terminals 2 (or uplink transmissions) with one another, and allocates radio resources in a current or future transmission period (e.g., subframe) to one or more radio terminals 2. Accordingly, the processor 401 is able to predict occurrences of uplink transmissions in the current or future transmission period by monitoring the uplink scheduling.

In Step 1102, the processor 401 estimates future available resources of the computer system 400 based on the uplink scheduling of the base station 1 (BBU 320). In Step 1103, the processor 401 adjusts the total number of iterations of the BP algorithm according to the estimated available resources.

In some implementations, the processor 401 may control the BP detector 500 to increase the total number of iterations as the estimated available resources increases, or conversely decrease the total number of iterations as the estimated available resources decreases. In some implementations, the processor 401 may determine the maximum total number of iterations and notify the BP detector 500 of the determined number. The BP detector 500 may execute the BP algorithm in accordance with the total number of iterations equal to or smaller than the maximum total number of iterations. The processor 401 may increase the maximum total number of iterations as the estimated available resources increases, or conversely decrease the maximum number of iterations as the estimated available resources decreases.

According to the processing in FIG. 11, the processor 401 is able to adaptively adjust the number of BP iterations in the BP detector 500 in view of the estimation of future available resources based on the uplink scheduling.

Fourth Embodiment

Configurations of a radio communication system and a base station according to this embodiment are similar to those in the examples described with reference to FIGS. 1 to 5. This embodiment provides one example of controlling the total number of iterations of the BP algorithm. In this embodiment, the processor 401 (or the controller functions) takes a latency constraint (requirement) of received signals to be processed in the BP algorithm further into account in adjusting the total number of BP iterations in the BP detector 500.

Figure 12:
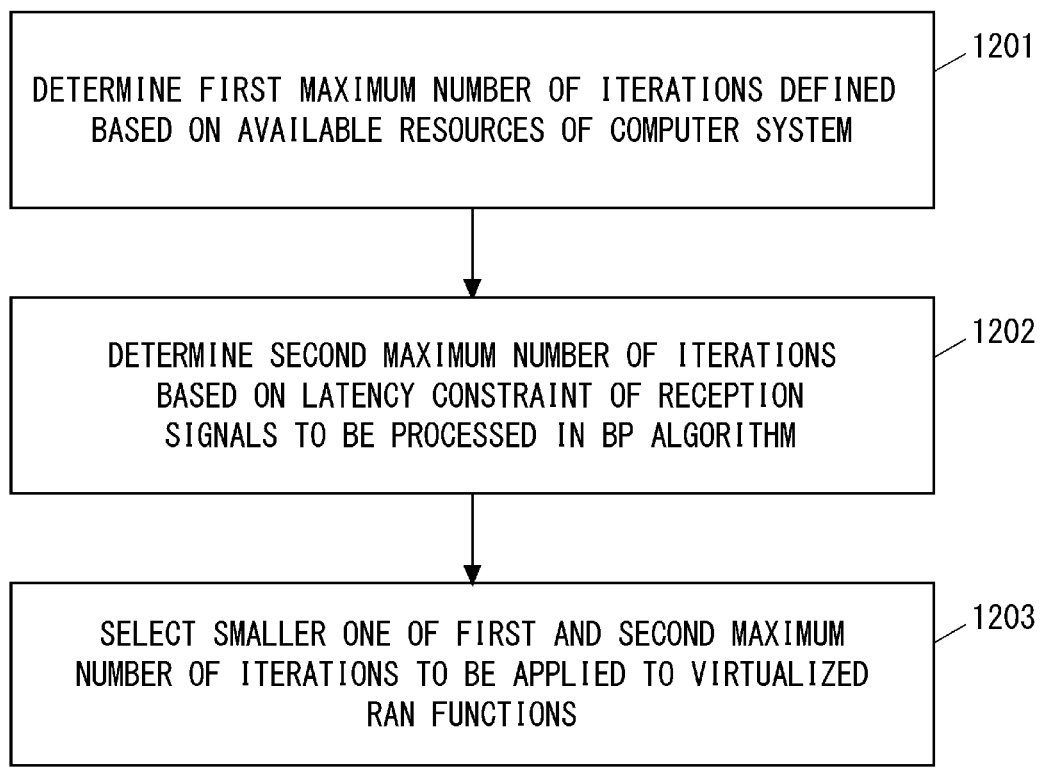
FIG. 12 is a flowchart showing one example of processing performed by a virtualized BBU according to an embodiment.

FIG. 12 shows one example of the controller functions provided by the processor 401 by executing the controller software 406. In Step 1201, the processor 401 determines a first maximum number of iterations defined based on the available resources of the computer system 400. The determination made in Step 1201 may be similar to that described in the first or third embodiment.

In Step 1202, the processor 401 determines a second maximum number of iterations based on a latency constraint of received signals to be processed in the BP algorithm. As the total number of iterations of the BP algorithm increases, the processing delay caused by multi-user detection increases. This would make it difficult to guarantee the latency constraint of the received signals. To avoid this, the processor 401 puts an upper limit on the total number of iterations, based on the latency constraint of the received signals. In some implementations, the processor 401 may refer to a Quality of Service (QoS) configuration of a wireless connection (e.g., Data Radio Bearer (DRB)) configured between the base station 1 (BBU 320) and each radio terminal 2 in order to find out the latency constraint of the received signals. The processor 401 may take into account the toughest latency constraint among various latency constraints of a plurality of wireless connections.

In Step 1203, the processor 401 selects a smaller one of the first maximum number of iterations and the second maximum number of iterations to be applied to the virtualized RAN functions (i.e., the BP detector 500). The processor 401 then applies the selected maximum number of iterations to the BP detector 500. The BP detector 500 performs the BP algorithm in accordance with the total number of iterations that is equal to or smaller than the maximum number of iterations.

According to the processing shown in FIG. 12, the processor 401 is able to adaptively adjust the number of BP iterations in the BP detector 500 in view of the latency constraint of received signals to be processed in the BP algorithm.

OTHER EMBODIMENTS

The parameter set (e.g., at least one of the scaling factors, the damping factors, or the node selection factors) to be used in the BP algorithm may not be obtained by machine learning. In some implementations, the scaling factors for the respective iterations may have the same value. Additionally or alternatively, the damping factors for the respective iterations may have the same value. Additionally or alternatively, the set of node selection factors for each iteration may follow a periodic pattern of selecting a subset from the reception antennas. In this case, the possible values of each node selection factor may be 0 or 1.

The above-described embodiments have provided the examples in which the base station 1 (or the BBU 320) performs the BP algorithm for multi-user detection (MIMO detection). Additionally or alternatively, the base station 1 may be configured to perform a BP algorithm for other purposes. The base station 1 may perform a BP algorithm for channel decoding of Low Density Parity Check (LDPC) codes or Sparse Superposition Codes (SSC). In another example, the base station 1 may perform a BP algorithm for signal detection to support massive connections in Sparse Code Multiple Access (SCMA). The processor 401 (or the controller functions) may adjust the total number of iterations of the BP algorithm to be performed for such purpose, according to the available resources of the computer system 400.

In the above-described embodiments, the processor 401 executes one or more programs including one or more sets of instructions for providing the virtualize RAN functions and control thereof. Each of these programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

Each of the programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

An example advantage according to the above-described embodiments is to provide an improvement suitable for implementation of a BP detector on shared computing resources.

The above-described embodiments are merely examples of applications of the technical ideas obtained by the inventors. These technical ideas are not limited to the above-described embodiments and various modifications can be made thereto.

The whole or part of the exemplary embodiments disclosed above can be described as, but not limited to, the following supplementary notes.

(Supplementary Note 1)

A computer system comprising:

at least one memory; and at least one processor coupled to the at least one memory and configured to execute one or more sets of instructions, the one or more sets of instructions, when executed by the at least one processor, causing the computer system to:

provide virtualized radio access network (RAN) functions including executing a Belief Propagation (BP) algorithm; and provide controller functions including adjusting a total number of iterations of the BP algorithm depending on available computing resources of the computer system.

(Supplementary Note 2)

The computer system according to Supplementary Note 1, wherein the at least one memory is configured to store a parameter set to be used by the BP algorithm, the parameter set includes a plurality of subsets that correspond to different total numbers of iterations, and the virtualized RAN functions include using in the BP algorithm a subset that corresponds to a total number of iterations equal to or smaller than a maximum total number of iterations determined by the controller function.

(Supplementary Note 3)

The computer system according to Supplementary Note 2, wherein the parameter set is obtained by deep learning.

(Supplementary Note 4)

The computer system according to Supplementary Note 2 or 3, wherein the parameter set comprises scaling factors, damping factors, node selection factors, or any combination thereof.

(Supplementary Note 5)

The computer system according to any one of Supplementary Notes 1 to 4, wherein the controller functions further include estimating the available computing resources based on uplink scheduling.

(Supplementary Note 6)

The computer system according to any one of Supplementary Notes 1 to 5, wherein the controller functions further include taking a latency constraint of a received signal to be processed in the BP algorithm further into account in adjusting the total number of iterations.

(Supplementary Note 7)

The computer system according to Supplementary Note 6, wherein the controller functions further include:

selecting a smaller one of a first maximum number of iterations defined based on the available computing resources and a second maximum number of iterations defined based on the latency constraint; and applying the selected maximum number to the virtualized RAN functions.

(Supplementary Note 8)

The computer system according to any one of Supplementary Notes 1 to 7, wherein the available computing resources comprise at least some of processing resources of the at least one processor, or at least some of memory resources of the at least one memory, or both.

(Supplementary Note 9)

A method performed by a computer system comprising at least one memory and at least one processor coupled to the at least one memory, the method comprising:

providing virtualized radio access network (RAN) functions including executing a Belief Propagation (BP) algorithm; and providing controller functions including adjusting a total number of iterations of the BP algorithm depending on available resources of the computer system.

(Supplementary Note 10)

The method according to Supplementary Note 9, wherein the at least one memory is configured to store a parameter set used by the BP algorithm, the parameter set includes a plurality of subsets that correspond to different total numbers of iterations, and the virtualized RAN functions include using in the BP algorithm a subset that correspond to a total number of iterations equal to or smaller than a maximum total number of iterations determined by the controller functions.

(Supplementary Note 11)

The method according to Supplementary Note 10, wherein the parameter set is obtained by deep learning.

(Supplementary Note 12)

The method according to Supplementary Note 10 or 11, wherein the parameter set comprises scaling factors, damping factors, node selection factors, or any combination thereof.

(Supplementary Note 13)

The method according to any one of Supplementary Notes 9 to 12, wherein the controller functions further include estimating the available resources based on uplink scheduling.

(Supplementary Note 14)

The method according to any one of Supplementary Notes 9 to 13, wherein the controller functions further include taking a latency constraint of a received signal to be processed in the BP algorithm further into account in adjusting the total number of iterations.

(Supplementary Note 15)

The method according to Supplementary Note 14, wherein the controller functions further include:

selecting a smaller one of a first maximum number of iterations defined based on the available resources and a second maximum number of iterations defined based on the latency constraint; and applying the selected maximum number to the virtualized RAN functions.

(Supplementary Note 16)

The method according to any one of Supplementary Notes 9 to 15, wherein the available resources comprise at least some of processing resources of the at least one processor, or at least some of memory resources of the at least one memory, or both.

(Supplementary Note 17)

A program including one or more sets of instructions that, when executed by a computer system comprising at least one memory and at least one processor coupled to the at least one memory, cause the computer system to:

provide virtualized radio access network (RAN) functions including executing a Belief Propagation (BP) algorithm; and provide controller functions including adjusting a total number of iterations of the BP algorithm depending on available resources of the computer system.

(Supplementary Note 18)

The program according to Supplementary Note 17, wherein the at least one memory is configured to store a parameter set to be used by the BP algorithm, the parameter set includes a plurality of subsets that correspond to different total numbers of iterations, and the virtualized RAN functions include using in the BP algorithm a subset that correspond to a total number of iterations equal to or smaller than a maximum total number of iterations determined by the controller functions.

(Supplementary Note 19)

The program according to Supplementary Note 18, wherein the parameter set is obtained by deep learning.

(Supplementary Note 20)

The program according to Supplementary Note 18 or 19, wherein the parameter set comprises scaling factors, damping factors, node selection factors, or any combination thereof.

What is claimed is:

1. A computer system comprising:
   at least one memory; and
   at least one processor coupled to the at least one memory and configured to execute one or more sets of instructions, the one or more sets of instructions when executed by the at least one processor, causing the computer system to:
   provide virtualized radio access network (RAN) functions including executing a Belief Propagation (BP) algorithm; and
   provide controller functions including adjusting a total number of iterations of the BP algorithm, wherein the adjusting the total number of iterations includes:
     selecting a smaller one of a first maximum number of iterations defined based on available computing resources of the computer system and a second maximum number of iterations defined based on a latency constraint of a received signal to be processed in the BP algorithm; and
     applying the selected maximum number of iterations to the virtualized RAN functions.

2. The computer system according to claim 1, wherein the at least one memory is configured to store a parameter set to be used by the BP algorithm,
   the parameter set includes a plurality of subsets that correspond to different total numbers of iterations, and
   the virtualized RAN functions include using in the BP algorithm a subset that corresponds to a total number of iterations equal to or smaller than the selected maximum number of iterations determined by the controller functions.

3. The computer system according to claim 2, wherein the parameter set is obtained by deep learning.

4. The computer system according to claim 2, wherein the parameter set comprises scaling factors, damping factors, node selection factors, or any combination thereof.

5. The computer system according to claim 1, wherein the controller functions further include estimating the available computing resources based on uplink scheduling.

6. The computer system according to claim 1, wherein the available computing resources comprise at least some of processing resources of the at least one processor, or at least some of memory resources of the at least one memory, or both.

7. A method performed by a computer system comprising at least one memory and at least one processor coupled to the at least one memory, the method comprising:
   providing virtualized radio access network (RAN) functions including executing a Belief Propagation (BP) algorithm; and
   providing controller functions including adjusting a total number of iterations of the BP algorithm, wherein the adjusting the total number of iterations includes:
     selecting a smaller one of a first maximum number of iterations defined based on available computing resources of the computer system and a second maximum number of iterations defined based on a latency constraint of a received signal to be processed in the BP algorithm; and
     applying the selected maximum number of iterations to the virtualized RAN functions.

8. The method according to claim 7, wherein
   the at least one memory is configured to store a parameter set to be used by the BP algorithm,
   the parameter set includes a plurality of subsets that correspond to different total numbers of iterations, and
   the virtualized RAN functions include using in the BP algorithm a subset that correspond to a total number of iterations equal to or smaller than the selected maximum number of iterations determined by the controller functions.

9. The method according to claim 8, wherein the parameter set is obtained by deep learning.

10. The method according to claim 8, wherein the parameter set comprises scaling factors, damping factors, node selection factors, or any combination thereof.

11. The method according to claim 7, wherein the controller functions further include estimating the available resources based on uplink scheduling.

12. The method according to claim 7, wherein the available resources comprise at least some of processing resources of the at least one processor, or at least some of memory resources of the at least one memory, or both.

13. A non-transitory computer readable medium storing a program comprising instructions, which when executed on a computer system comprising at least one memory and at least one processor coupled to the at least one memory causes the computer system to:
   provide virtualized radio access network (RAN) functions including executing a Belief Propagation (BP) algorithm; and
   provide controller functions including adjusting a total number of iterations of the BP algorithm, wherein the adjusting the total number of iterations includes:
     selecting a smaller one of a first maximum number of iterations defined based on available computing resources of the computer system and a second maximum number of iterations defined based on a latency constraint of a received signal to be processed in the BP algorithm; and
     applying the selected maximum number of iterations to the virtualized RAN functions.

14. The non-transitory computer readable medium according to claim 13, wherein
   the at least one memory is configured to store a parameter set to be used by the BP algorithm,
   the parameter set includes a plurality of subsets that correspond to different total numbers of iterations, and
   the virtualized RAN functions include using in the BP algorithm a subset that correspond to a total number of iterations equal to or smaller than the selected maximum number of iterations determined by the controller functions.

15. The non-transitory computer readable medium according to claim 14, wherein the parameter set is obtained by deep learning.

16. The non-transitory computer readable medium according to claim 14, wherein the parameter set comprises scaling factors, damping factors, node selection factors, or any combination thereof.

* * * * *